United States Patent Office 3,361,766
Patented Jan. 2, 1968

3,361,766
B-NORTESTOLOLACTONES
Louis R. Fare, Willingboro, and Kenneth G. Holden, Stratford, N.J., and Joseph R. Valenta, Strafford, Pa., assignors to Smith Kline & French Laboratories, Philadelphia, Pa., a corporation of Pennsylvania
No Drawing. Filed May 3, 1965, Ser. No. 452,878
4 Claims. (Cl. 260—343.2)

ABSTRACT OF THE DISCLOSURE

B-nortestololactone is prepared by the action of *P. citrinum* on B-norprogesterone. Chemical or microbiological dehydrogenation gives the $\Delta^1$ analog. The 19-nor-B-nor compound is prepared chemically. The products possess central nervous system depressant activity.

---

This invention relates to B-nortestololacetones having unexpected central nervous system depressant activity. In particular, the invention relates to B-nortestololactone, 19-nor-B-nortestololactone, and $\Delta^1$-B-nortestololactone.

The compounds of the present invention are represented by the following structural formula:

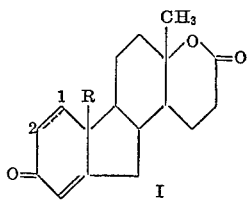

where R is hydrogen or methyl, and where R is methyl, the dotted line in the 1–2 position represents an optional double bond.

The preferred compounds of the invention are the B-nortestololactones of Formula I, in which R is methyl. In particular, B-nortestololactone is highly active as a central nervous system depressant.

The compounds of the present invention are prepared either by microbiological or chemical methods, or by a combination thereof. B-nortestololactone is prepared by a microbiological procedure. $\Delta^1$-B-nortestololactone is prepared from B-nortestololactone either by chemical or microbiological means. 19-nor-B-nortestololactone is prepared by a chemical method.

B-nortestololactone is produced by subjecting B-norprogesterone to the action of enzymes of *Penicillium citrinum* ATCC 16040. Following the fermentation, filtration, and extraction procedure, the residual solid, which is a mixture of B-nortestololactone and the open-chain intermediate B-nortestolic acid (II), is refluxed in base to obtain complete

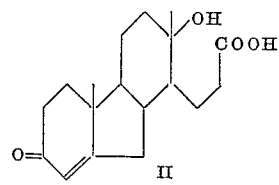

conversion to B-nortestolic acid. Treatment of the intermediate with a strong acid such as perchloric acid results in ring closure to B-nortestololactone. Introduction of the double bond is accomplished by subjecting the B-nortestololactone to the action of enzymes of *Arthrobacter simplex* ATCC 6946 or *Protaminobacter ruber* ATCC 8457.

Alternatively, the $\Delta^1$ compound is prepared by treatment of B-nortestololactone with 2,3-dichloro-5,6-dicyanobenzoquinone.

19-nor-B-nortestololactone (I, R=H) is prepared by the chemical procedure illustrated and described below:

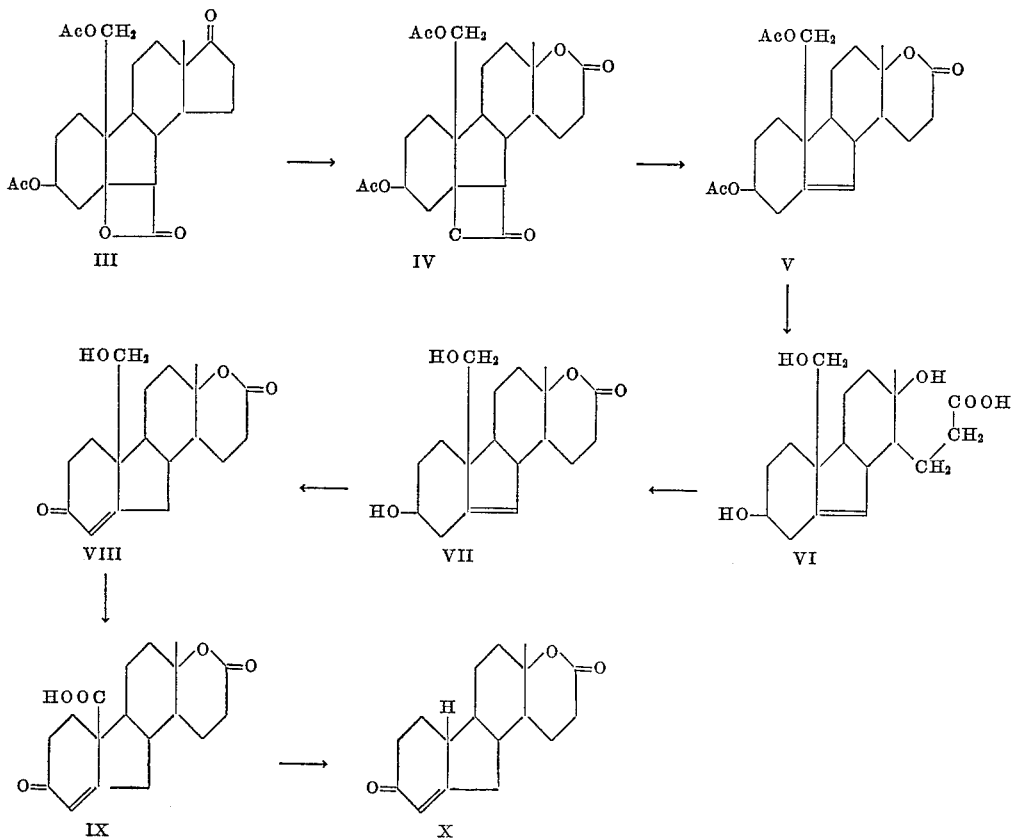

3β,19-diacetoxy - 5β - hydroxy-17-oxo-B-norandrostane-6β-carboxylic acid 5,6-lactone (III) is oxidized to the dilactone IV by means of peracetic acid. The dilactone is heated above its melting point, resulting in decarboxylation to compound V. Basic hydrolysis with, for example, sodium hydroxide yields the trihydroxy seco carboxylic acid VI. Acidification with a strong acid such as perchloric reforms the lactone VII. The 3-hydroxy group is oxidized to a ketone by the Oppenauer procedure, using cyclohexanone and aluminum isopropoxide, the 19-carbon atom bearing a hydroxy group is oxidized to a carboxylic acid with Jones reagent (chromium trioxide and sulfuric acid in acetone), and this carboxyl group is eliminated by refluxing the acid with Girard's T reagent in acetic acid and methanol. The resulting product is 19-nor-B-nor-testololactone (X).

The B-norprogesterone starting material for the preparation of the B-nortestololactones is described in Kerwin U.S. Patent No. 3,072,681. The 3β,19-diacetoxy-5β-hydroxy-17-oxo-B-norandrostane-6β-carboxylic acid 5,6-lactone starting material for the preparation of the 19-nor-B-nortestololactone is prepared as follows: 3β,19-acetoxy-androst-5-en-17-one (J. Kalvoda et al., Helv. Chim. Acta, 46, 1361 (1963)) is epoxidized with m-chloroperbenzoic acid. Chromic acid converts this compound to 3β,19-diacetoxy-5α-hydroxyandrostane-6,17-dione. The B-ring is then opened by treatment with m-chloroperbenzoic acid to give 3β,19-acetoxy-5,17-dioxo-5,6-secoandrostan-6-oic acid. This compound is then dissolved in pyridine and treated with benzoyl chloride to give 3β,19-diacetoxy-5β-hydroxy-17-oxo-B-norandrostane-6β-carboxylic acid 5,6-lactone.

When microbiological processes are used, the microorganisms are first cultivated in or on a medium favorable to their development.

Liquid media are preferred for submerged fermentations. For the *P. citrinum* fungus, such media as malt extract broth, cornsteep liquor, soybean meal broth, peanut meal broth or Czapek-Dox broth have all been found satisfactory. For the bacterial species listed above, plain nutrient broth, Trypticase Soy Broth (Baltimore Biological Laboratories) or yeast extract broth are most satisfactory. The media should contain sources of available carbon, nitrogen and minerals.

Carbohydrates such as starches, dextrins and sugars, including hexoses and pentoses, may be used to furnish the energy and carbon requirements of the microorganisms. However, other sources of carbon may also be used, for example, citric acid and its salts, sodium acetate, or the sodium or potassium salts of other low molecular weight fatty acids or alcohols.

Sources of nitrogen in assimilable form can be made available by soluble or insoluble vegetable or animal proteins or protein derivatives such as cornsteep liquor, soybean meal, peanut meal, casein, meat extracts, peptones and yeast extract. Amino acids, ammonium salts or nitrates can also be used.

Minerals naturally present in the above complex carbon and nitrogen sources are usually sufficient to satisfy the mineral requirements of the microorganisms. If mineral-deficient media are used, any of the commonly used physiological mineral solutions can be used satisfactorily to supplement the chemically defined medium.

A sterile air supply should be maintained during the fermentation. This can be accomplished by exposing a large surface of the growth medium to the atmosphere with constant agitation, or alternatively by the use of submerged aeration devices. Aeration at a rate of about 0.5 to 2.0 volumes of air per volume of growth medium per minute produces satisfactory results.

During the fermentation the temperature should be maintained within a range of about 23° C. to 32° C., preferably from about 25° C. to 30° C.

Optimum growth of the microorganisms and transformation of the steroid substrates are achieved when the pH of the fermentation is maintained within a range of pH 6.0 to 6.8. This may be accomplished by the intermittent addition of mineral acids or bases to adjust the pH, or also by the incorporation of buffering agents in the fermentation medium. Buffering agents such as calcium carbonate or potassium dihydrogen phosphate may be used.

The steroid substrate to be transformed is added to the growing culture of the microorganism as a finely divided solid or in solution in a suitable solvent, such as ethanol, methanol or acetone. The addition of the steroid substrate to the microbial culture should be made under aseptic conditions. The incubation and aeration of the culture is continued in order to bring about the transformation of the steroid substrate. Alternatively, the steroid substrate may be added to the fermentation medium at the time the medium is first inoculated with the culture of microorganism.

The fermentation or biotransformation process is continued until the maximum amount of product has accumulated. This usually occurs within about 24–48 hours, and is most easily determined by periodic analysis of the fermentation system. This analysis can best be carried out chromatographically, as this method gives a quick and accurate representation of the types and relative concentrations of the steroid compounds present. We have used both paper and thin layer chromatography for analysis. The actual methods used, as cited in the examples below, are well-known to persons skilled in the art.

When the steroid transformation has progressed to its optimum stage, the fermentation is terminated and the steroid compounds, both untransformed substrate and the transformation products, are recovered. This is most commonly done by extraction of the aqueous fermentation broth with organic solvents which are immiscible with water. Chloroform, methylene chloride or methyl isobutyl ketone are most satisfactorily used. The whole fermentation broth, including microbial cells and aqueous supernatant fluid, can be extracted or alternatively the cellular mass of the microorganism can first be separated from the aqueous supernatant fluid by centrifugation or filtration. In the latter case, extraction of steroid compounds from the microbial cellular mass is best accomplished by a mixture of solvents, one of which is water-miscible, the other water-immiscible. We have found a 1:1 mixture of methylene chloride:ethanol most satisfactory. By extracting cells and aqueous supernatant broth separately, the formation of troublesome emulsions is often avoided.

The solvent extracts are pooled and residual traces of water are removed with suitable drying agents, such as anhydrous sodium sulfate. The dried solvent extract is then concentrated in vacuo to dryness at temperatures generally not exceeding 60° C. A brownish-colored residue results which contains the steroid compounds of interest as well as many solvent extractable miscellaneous compounds produced as a result of microbial metabolism. It is necessary to remove these contaminating materials in order to obtain the steroid compounds in a purified state.

In certain cases in which the desired steroid product is present in high concentration, purification can be achieved by direct crystallization with solvents. Acetone:hexane mixtures are often used.

However, if a mixture of steroid products results from the fermentation process, or if a significant amount of untransformed steroid substrate remains, more elaborate purification procedures are required. We have used column chromatography most satisfactorily for these purifications. The methods used are known to those skilled in the art, and consist in general of the gradient elution of the steroids from a column of adsorbent material (such as silica or alumina) by mixtures of organic solvents. The presence of the separated steroidal compounds in the solvent fractions obtained after column chromatography is most easily determined by paper or thin layer chromatographic analysis of aliquot samples. The appropriate fractions containing purified steroids are pooled, concentrated in vacuo, and the purified steroids are crystallized from appropriate solvent mixtures.

The compounds of the invention are administered orally as tablets or capsules or by injection in effective, but non-toxic doses. Tablets and capsules contain, in addition to the B-nortestololactones of the invention, standard pharmaceutical excipients. An injectable formulation consists of the steroid dissolved or suspended in saline, sugar, or water solution, or in an oil such as sesame oil.

The following examples illustrate the preparation of the compounds of the invention, but are not to be considered as limiting the scope thereof.

EXAMPLE 1

*B-nortestololactone*

The inoculum is prepared as follows: Fifty milliliters of 0.5% glucose in 2% corn steep liquor is sterilized in a 250 ml. flask by autoclaving for 15 minutes at 15 p.s.i. and 121° C. A vegetative culture (0.5 ml.) of *Penicillium citrinum* ATCC 16040 is then introduced, and the system is then incubated for 24 hours at 30° C. on a gyrorotary shaker at 200 r.p.m.

The fermentation medium is prepared as follows: Sixty-five liters of 2% corn steep liquor with 0.5% dextrose is autoclaved at 125° C., 20 p.s.i. for approximately 30 minutes in a 130-liter New Brunswick Batch Fermenter. Ten percent of the inoculum is then introduced into the fermentation medium, the speed of agitation is set at 200 r.p.m., the aeration rate of 0.5 v.v.m., and the temperature maintained at 30° C. Ucon oil is used as an antifoam agent. The fermentation medium is then incubated for 6–24 hours.

To the fermentation medium is added a solution of 65 g. of B-norprogesterone in 500 ml. of ethanol and the fermentation is allowed to proceed for approximately 16 hours after the addition of the B-norprogesterone.

The fermentation broth is then filtered through Supercel, the broth is then extracted with methylene chloride, and the filtered cells are extracted with a mixture of methylene chloride and ethanol. The solvents are evaporated to a solid residue.

This residue is dissolved in 800 ml. of ethanol, treated with 100 ml. of 40% aqueous sodium hydroxide solution, and refluxed under a nitrogen atmosphere for three hours. The cooled solution is diluted with 3 l. of cold water and extracted with methylene chloride. The aqueous phase is acidified with concentrated hydrochloric acid and extracted with methylene chloride. Evaporation of this dried methylene chloride extract gives B-nortestolic acid.

This acid is dissolved in 300 ml. of tetrahydrofuran containing 1 ml. of 70% perchloric acid and allowed to stand for one hour at room temperature. After diluting to 3 l. with cold water, the reaction mixture is extracted with methylene chloride and the methylene chloride extracts are washed with 2% aqueous sodium hydroxide. The dried methylene chloride extracts are filtered through 125 g. of activity III Woelm alumina and the filtrate is evaporated to give B-nortestololactone, which, after crystallization from acetone-hexane and then methanol-water, melts at 150–152°, UV: $\lambda_{max}$ 240 m$\mu$ ($\epsilon$15,600).

EXAMPLE 2

*$\Delta^1$-B-nortestololactone*

B-Nortestololactone (4.35 g.) is dissolved in 100 ml. of dioxane and treated with 3.7 g. of 2,3-dichloro-5,6-dicyanobenzoquinone. After refluxing at room temperature for 16 hours, the reaction mixture is filtered and the filtrate evaporated to give crude $\Delta^1$-B-nortestololactone. Further purification is effected by chromatography on alumina followed by recrystallization from acetone-hexane.

EXAMPLE 3

*$\Delta^1$-B-nortestololactone*

One ml. of a broth stock culture of *Arthrobacter simplex* ATCC 6946 is inoculated into 50 ml. of sterile Trypticase Soy Broth (Baltimore Biological Laboratories) contained in a 250 ml. flask, and incubated 24 hours at 25° C. on a gyrorotary shaker describing a 2-inch circle at 200 r.p.m. This culture is in turn used to inoculate 500 ml. of the same medium in a 2-liter flask which has been shaken 24 hours at 25° C. This culture is used for the transformation process.

One gram of B-nortestololactone is dissolved in 10 ml. of ethanol and added to the 24-hour culture above under sterile conditions. The incubation of the culture containing the steroid is continued for an additional 24 hours.

The reaction is monitored by taking 1 ml. samples during the course of the biotransformation, and extracting these samples with 0.2 ml. of methyl isobutyl ketone (MIBK). 5 microliters of the MIBK extract is spotted on Silica Gel G thin layer chromatography plates, which are then developed in ethyl acetate. The dried plates after development are sprayed with 40% sulfuric acid in ethanol to detect the presence and relative concentrations of the steroidal compounds.

The transformation is terminated 24 hours after addition of the steroid to the culture, and the bacterial cells are separated from the supernatant broth by centrifugation. The centrifugate is acidified to ca. pH 3.0 with phosphoric acid and extracted twice with equal volumes of methylene chloride. The separated bacterial cells are extracted with 100 ml. of a mixture of equal volumes of ethanol and methylene chloride. These extracts are combined, dried with anhydrous sodium sulfate and evaporated to dryness.

The dried residue is dissolved in benzene and applied to an alumina (Woelm Grade III) column. To separate the product from the untransformed steroid substrate, the following series of eluting solvents is used: benzene, a benzene:methylene chloride mixture, methylene chloride and finally 1% methanol in methylene chloride. 15-milliliter fractions are collected during the process of elution. 5 to 10 microliters of each fraction is spotted on Silica Gel G thin layer chromatography plates for analysis.

The fractions containing the product, $\Delta^1$-B-nortestololactone, are combined and evaporated to dryness in vacuo. The purified product is crystallized from an acetone:hexane mixture, M.P. 176–180°.

EXAMPLE 4

*$\Delta^1$-B-nortestololactone*

The procedure used is essentially the same as in Example 3, except that *Protaminobacter ruber* ATCC 8457 is used in place of *A. simplex*.

EXAMPLE 5

*19-nor-B-nortestololactone*

To a solution of 43.6 g. of 3$\beta$,19-diacetoxyandrost-5-en-17-one (see J. Kalvoda et al., Helv, Chim. Acta., 46, 1361 (1963)) in 300 ml. of chloroform is added 25.8 g. of m-chloroperbenzoic acid in 150 ml. of chloroform. The addition is carried out with stirring so that the temperature of the reaction mixture is maintained at 25–30° C. After addition is complete the reaction mixture is allowed to stand for three hours and is then washed with aqueous sodium sulfite and then with aqueous sodium carbonate solution. Drying and evaporation of the chloroform phase gives a residue which is crystallized from acetone-hexane to give 3$\beta$,19-diacetoxy-5,6-epoxyandrostan-17-one M.P. 128–129° C.

To a stirred solution of 3$\beta$,19-diacetoxy-5,6-epoxyandrostan-17-one (42 g.) in 1200 ml. of methyl ethyl ketone is added aqueous chromic acid (50 g. of chromium trioxide in 100 ml. of water) at such a rate that the temperature of the reaction mixture does not exceed 40° C. After addition is complete the reaction mixture is maintained at 40° C. for one hour and is then poured into 2500 ml. of water. Extraction with methylene chloride, followed by drying and evaporation of the organic extracts gives crude 3β,19 - diacetoxy-5α-hydroxyandrostane-6,17-dione which may be used in the next step without purification.

To a solution of 42 g. of the crude dione in 200 ml. of chloroform is added 50 g. of m-chloroperbenzoic acid in 350 ml. of chloroform. The addition is carried out slowly with stirring so that the reaction temperature does not rise above 30° C. After stirring at room temperature for 24 hours the reaction mixture is washed with 10% aqueous sodium sulfite solution (500 ml.) and then with 5% aqueous sodium bicarbonate solution (700 ml.). The sodium bicarbonate phase is acidified with phosphoric acid and extracted with chloroform to give, after drying and evaporation of the chloroform, a mixture of m-chlorobenzoic acid and 3β,19-diacetoxy-5,17-dioxo - 5,6 - secoandrostan-6-oic acid.

The above mixture is dissolved in 150 ml. of pyridine and treated with 50 ml. of benzoyl chloride with cooling. After standing for 24 hours at room temperature the reaction mixture is poured into 1500 ml. of water and extracted with methylene chloride. After washing with cold aqueous phosphoric acid and sodium carbonate solutions, the methylene chloride extracts are combined, dried and evaporated. The residue is crystallized from ether to give 3β,19-diacetoxy 5β-hydroxy-17-oxo-B-norandrostan-6-carboxylic acid 5,6 lactone, M.P. 170° C.

To a solution of 5.0 g. of 3β,19-diacetoxy-5β-hydroxy-17-oxo-B-norandrostane-6β-carboxylic acid 5,6-lactone in 25 ml. of glacial acetic acid containing 0.5 g. of p-toluenesulfonic acid, is added 5.0 ml. of peracetic acid in 20 ml. of glacial acetic acid. The solution is maintained at room temperature in the dark for 24 hours and is then poured into 300 ml. of ice water. The precipitate is collected by filtration and is purified by recrystallization from acetone-hexane to give 3,19 - diacetoxy-5β,13α-dihydroxy-B-nor-13,17-seco-androstane-6β,17-dicarboxylic acid 5,6 - 13,17-dilactone.

The dilactone (23.2 g.) is heated above its melting point under a nitrogen atmosphere for 15 minutes, cooled and crystallized from acetone-hexane to give 3β,19-diacetoxy-13α-hydroxy-B-nor-13,17-secoandrost-5-en-17-oic acid 13, 17-lactone.

A solution of 18.5 g. of the lactone in 250 ml. of ethanol is refluxed with 20 ml. of 40% aqueous sodium hydroxide for three hours under a nitrogen atmosphere. The cooled reaction mixture is diluted with 1.5 l. of water, adjusted to pH 3 with phosphoric acid, and extracted with methylene chloride. The combined and dried methylene chloride extracts are evaporated under reduced pressure to give 3β,13α,19 - trihydroxy - B - nor - 13,17 - secoandrost - 5-en-17-oic acid.

A solution of 14.3 g. of the acid in 100 ml. of tetrahydrofuran containing 0.5 ml. of 70% perchloric acid is maintained at room temperature for one hour. The solution is diluted with 500 ml. of cold water and the precipitate of 3β,13α,19-trihydroxy-B-nor-13,17-secoandrost-5-en-17-oic acid 3,17-lactone collected by filtration and purified by recrystallization from acetone-hexane.

A mixture of 12.1 g. of the lactone, 60 ml. of cyclohexanone and 200 ml. of toluene is slowly distilled until about 10 ml. of distillate is collected. Then 3.0 g. of aluminum isopropoxide is added and distillation is continued until 140 ml. of distillate is collected. The cooled reaction mixture is poured into 300 ml. of cold, dilute hydrochloric acid and extracted with benzene. The combined benzene extracts are steam distilled until the distillate is clear. The cooled non-volatile fraction is extracted with methylene chloride. After drying and evaporation of the methylene chloride extracts the residue of 19-hydroxy-B-nortestololactone is purified by crystallization from acetone-hexane.

To a solution of 8.7 g. of the lactone in 160 ml. of acetone is added 24 ml. of Jones reagent (chromium trioxide and sulfuric acid in acetone) during 20 minutes at 5°. After an additional 15 minutes at 5°, the reaction mixture is poured into 1 l. of ice water and is extracted with methylene chloride. The methylene chloride extracts are extracted with 5% sodium carbonate solution (5 x 100 ml.). The combined sodium carbonate solutions are adjusted to pH 3 with phosphoric acid and extracted with methylene chloride. Evaporation of methylene chloride extract gives B-nortestololactone-18-oic acid.

A solution of 7.1 g. of the acid and 13.5 g. of Girard's T reagent in 160 ml. of acetic acid and 300 ml. of methanol is refluxed for two hours. The cooled solution is treated with 17.8 g. of sodium carbonate in 2.5 l. of water and extracted with methylene chloride. The aqueous layer is acidified to pH 1 with hydrochloric acid and allowed to stand at room temperature for two hours. Extraction with methylene chloride gives, after drying and evaporation of the extracts, 19-nor-B-nortestololactone, which is crystallized from acetone-hexane.

We claim:
1. A steroid selected from the group consisting of a steroid of the structure:

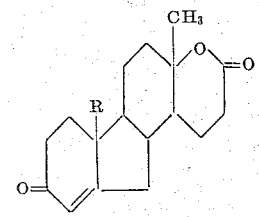

wherein R is selected from the group consisting of hydrogen and methyl, and the $\Delta^1$ analog of said compound when R is methyl.
2. B-nortestololactone.
3. $\Delta^1$-B-nortestololactone.
4. 19-nor-B-nortestololactone.

References Cited
UNITED STATES PATENTS
3,132,153   5/1964   Ringold et al. _____ 260—343.2

JAMES A. PATTEN, Primary Examiner.